United States Patent
Zhao et al.

(10) Patent No.: US 9,726,324 B2
(45) Date of Patent: Aug. 8, 2017

(54) PROTECTION CIRCUIT FOR MACHINE TOOL CONTROL CENTER

(71) Applicants: HONG FU JIN PRECISION INDUSTRY (WuHan) CO., LTD., Wuhan (CN); HON HAI PRECISION INDUSTRY CO., LTD., New Taipei (TW)

(72) Inventors: Long Zhao, Wuhan (CN); Yi-Hung Peng, New Taipei (TW)

(73) Assignees: HONG FU JIN PRECISION INDUSTRY (WuHan) CO., LTD., Wuhan (CN); HON HAI PRECISION INDUSTRY CO., LTD., New Taipei (TW)

( * ) Notice: Subject to any disclaimer, the term of this patent is extended or adjusted under 35 U.S.C. 154(b) by 649 days.

(21) Appl. No.: 14/310,093

(22) Filed: Jun. 20, 2014

(65) Prior Publication Data

US 2014/0379109 A1 Dec. 25, 2014

(30) Foreign Application Priority Data

Jun. 21, 2013 (CN) .......................... 2013 1 02488392

(51) Int. Cl.

| | |
|---|---|
| *G08B 23/00* | (2006.01) |
| *F16P 3/14* | (2006.01) |
| *G08B 21/22* | (2006.01) |
| *G08B 21/24* | (2006.01) |
| *G08B 21/06* | (2006.01) |

(52) U.S. Cl.
CPC ................ *F16P 3/14* (2013.01); *G08B 21/22* (2013.01); *G08B 21/24* (2013.01); *G08B 21/06* (2013.01)

(58) Field of Classification Search
CPC .... G08B 21/22; G08B 21/0288; G08B 21/24; G08B 13/08; G08B 23/00; G08B 3/10; H04W 64/00
USPC ............... 340/573.1, 686.1, 500, 540, 686.6, 340/539.23; 73/1.79
See application file for complete search history.

(56) References Cited

U.S. PATENT DOCUMENTS

| | | | | |
|---|---|---|---|---|
| 7,652,583 | B2 * | 1/2010 | Sanchez ............... | B60K 28/066 340/575 |
| 8,207,858 | B2 * | 6/2012 | Knopf ..................... | E04G 21/32 340/5.1 |
| 8,384,548 | B2 * | 2/2013 | Knopf ..................... | E04G 21/32 340/5.1 |
| 2009/0040014 | A1 * | 2/2009 | Knopf ..................... | E04G 21/32 340/5.1 |
| 2010/0123980 | A1 * | 5/2010 | Lee ........................ | B23D 59/00 361/23 |

(Continued)

*Primary Examiner* — Hoi Lau
(74) *Attorney, Agent, or Firm* — Steven Reiss

(57) ABSTRACT

A protection circuit is coupled to a switch circuit of a machine tool for protection. The protection circuit comprises a fatigue protection unit and a misoperation protection unit. The fatigue protection unit comprises a first sensor, a first processor, a first controller, and an alarm module. The misoperation protection unit comprises a second sensor, a second processor, and a second controller. The protection circuit senses the degree of fatigue and the misoperation of people through the fatigue protection unit and the misoperation protection unit, then controls the machine tool to work or not to work to avoid accidents.

18 Claims, 3 Drawing Sheets

(56) References Cited

U.S. PATENT DOCUMENTS

| | | | |
|---|---|---|---|
| 2012/0092172 A1* | 4/2012 | Wong | G06F 3/011 340/575 |
| 2014/0379109 A1* | 12/2014 | Zhao | F16P 3/14 700/95 |
| 2016/0235323 A1* | 8/2016 | Tadi | A61B 5/7285 |

* cited by examiner

PROTECTION CIRCUIT FOR MACHINE TOOL CONTROL CENTER

FIELD

The subject matter herein generally relates to a machine tool protection circuit.

BACKGROUND

The operations of machine tools can be dangerous, therefore protection for the operators is needed.

BRIEF DESCRIPTION OF THE DRAWINGS

Implementations of the present technology will now be described, by way of example only, with reference to the attached figures, wherein.

DETAILED DESCRIPTION

Figure 1:
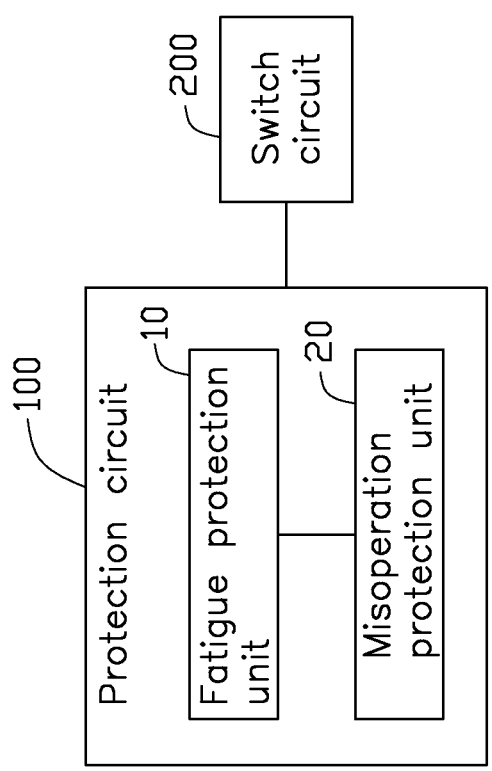
FIG. 1 is a block diagram of an embodiment of a machine tool protection circuit coupled to a switch circuit of the machine tool, and the protection circuit comprises a fatigue protection unit and a misoperation protection unit.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

Several definitions that apply throughout this disclosure will now be presented.

The term "coupled" is defined as connected, whether directly or indirectly through intervening components, and is not necessarily limited to physical connections. The term "comprising" means "including, but not necessarily limited to"; it specifically indicates open-ended inclusion or membership in a so-described combination, group, series and the like.

The present disclosure is described in relation to a protection circuit 100 employed in machine tool operations.

FIG. 1 illustrates an embodiment of the protection circuit 100 coupled to a switch circuit 200 of a machine tool. The protection circuit 100 can comprise a fatigue protection unit 10 and a misoperation protection unit 20.

Figure 2:
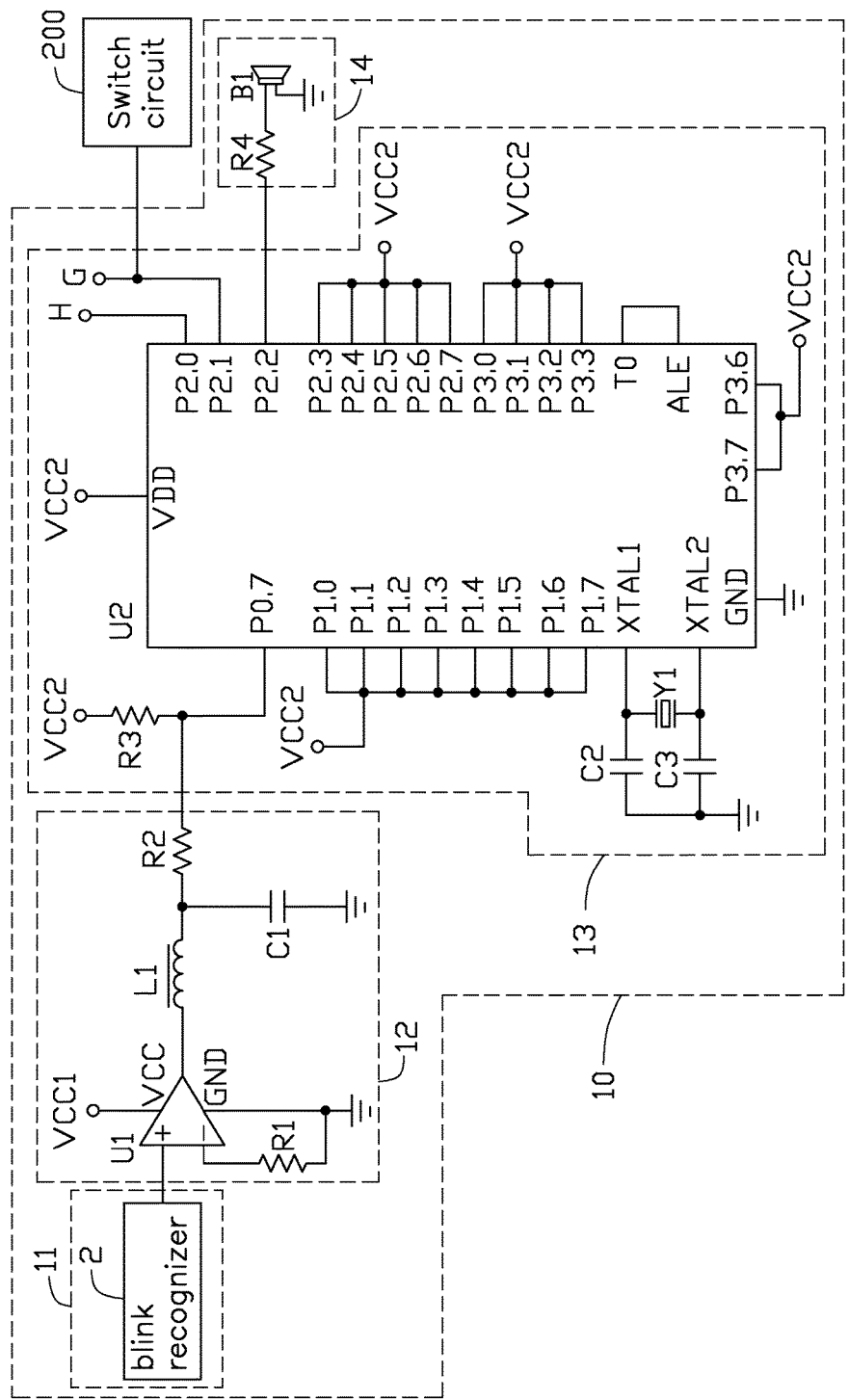
FIG. 2 is a circuit diagram of an embodiment of the fatigue protection unit coupled to the switch circuit of FIG. 1.

FIG. 2 illustrates an embodiment of the fatigue protection unit 10 coupled to the switch circuit 200. The fatigue protection unit 10 can comprise a first sensor 11, a first processor 12, a first controller 13, and an alarm module 14. In the embodiment, the first sensor 11 can be a blink recognizer 2. The blink recognizer 2 can detect a blink of an operator who is operating the machine tool. The blink recognizer 2 can output a pulse signal in response to a blink. The first processor 12 can comprise a first comparator U1, an inductor L1, a capacitor C1, and two resistors R1, R2. A non-inverting input terminal of the first comparator U1 is coupled to the blink recognizer 2 for receiving the pulse signals from the blink recognizer 2. An inverting input terminal of the first comparator U1 is coupled to ground through the resistor R1. A power terminal VCC of the first comparator U1 is coupled to a first power supply VCC1. A ground terminal GND of the first comparator U1 is coupled to ground. An output terminal of the first comparator U1 is coupled to ground through the inductor L1 and the capacitor C1 in that order. A node between the inductor L1 and the capacitor C1 is coupled to a first terminal of the resistor R2. A second terminal of the resistor R2 is coupled to the first controller 13. The first processor 12 can magnify and smooth the pulse signals, and can prevent electromagnetic interference of the pulse signals.

The first controller 13 can comprise a microcontroller U2, a resistor R3, two capacitors C2, C3, and a crystal oscillator Y1. A power pin VDD of the microcontroller U2 is coupled to a second power supply VCC2. An input/output (I/O) pin P0.7 of the microcontroller U2 is coupled to the second power supply VCC2 through the resistor R3. The I/O pin P0.7 of the microcontroller U2 is coupled to the second terminal of the resistor R2. I/O pins P1.0-P1.7, P2.3-P2.7, P3.0-P3.3, P3.6, and P3.7 of the microcontroller U2 are coupled to the second power supply VCC2. An I/O pin P2.0 of the microcontroller U2 is coupled to the misoperation protection unit 20. An I/O pin P2.1 of the microcontroller U2 is coupled to the switch circuit 200. An I/O pin P2.2 of the microcontroller U2 is coupled to the alarm module 14. A timer pin TO of the microcontroller U2 is coupled to a pulse pin ALE of the microcontroller U2. A first clock pin XTAL1 of the microcontroller U2 is coupled to a second clock pin XTAL2 of the microcontroller U2 through the crystal oscillator Y1. The first and the second clock pins XTAL1, XTAL2 of the microcontroller U2 are coupled to ground through the capacitors C2, C3, respectively. A ground pin GND of the microcontroller U2 is coupled to ground.

The alarm module 14 can comprise a buzzer B1 and a resistor R4. A signal pin of the buzzer B1 is coupled to the I/O pin P2.2 of the microcontroller U2 through the resistor R4. A ground pin of the buzzer B1 is coupled to ground.

Figure 3:
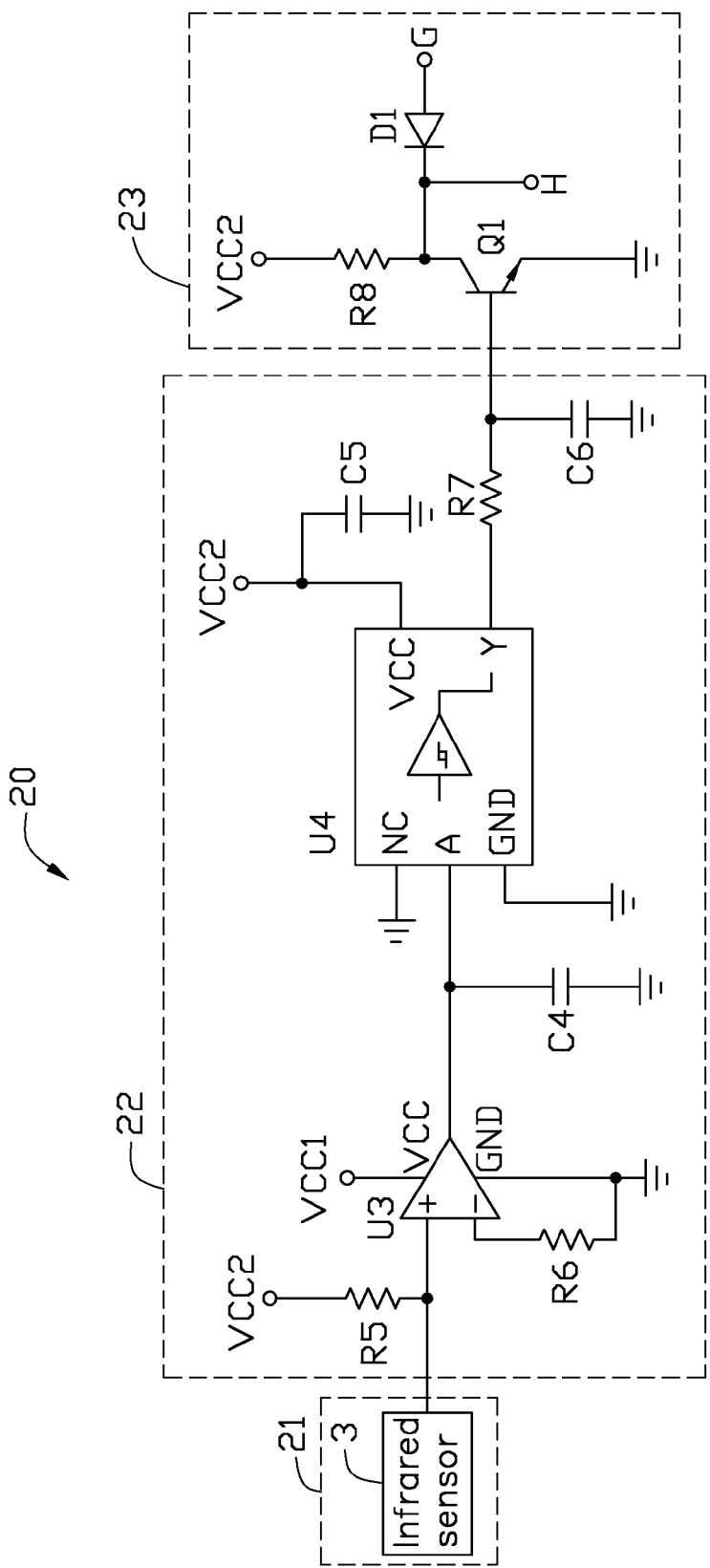
FIG. 3 is a circuit diagram of an embodiment of the misoperation protection unit of FIG. 1.

FIG. 3 illustrates an embodiment of the misoperation protection unit 20. The misoperation protection unit 20 can comprise a second sensor 21, a second processor 22, and a second controller 23. In the embodiment, the second sensor 21 can be an infrared sensor 3. The infrared sensor 3 can output a sense signal in response to the infrared sensor 3 sensing that a distance between a person and the machine tool is less than a preset distance. The second processor 22 can comprise three resistors R5-R7, a second comparator U3, three capacitors C4-C6, and a trigger U4. A non-inverting input terminal of the second comparator U3 is coupled to the second power supply VCC2 through the resistor R5. The non-inverting input terminal of the second comparator U3 is coupled to the infrared sensor 3 for receiving the sense signals. An inverting input terminal of the second comparator U3 is coupled to ground through the resistor R6. A power terminal VCC of the second comparator U3 is coupled to the first power supply VCC1. A ground terminal GND of the second comparator U3 is coupled to ground. An output terminal of the second comparator U3 is coupled to ground through the capacitor C4. The output terminal of the second comparator U3 is coupled to a first input pin A of the trigger U4. A second input pin NC of the trigger U4 is coupled to ground. A ground pin of the trigger U4 is coupled to ground. A power pin VCC of the trigger U4 is coupled to the second power supply VCC2. The power pin VCC of the trigger U4 is coupled to ground through the capacitor C5. An output pin of the trigger U4 is coupled to ground through the resistor R7 and the capacitor C6 in that order. A node between the resistor R7 and the capacitor C6 is coupled to the second controller 23. The second processor 22 can magnify, smooth, and shape the sense signals.

The second controller 23 can comprise an electronic switch Q1, a resistor R8, and a diode D1. A first terminal of the electronic switch Q1 is coupled to the node between the resistor R7 and the capacitor C6. A second terminal of the electronic switch Q1 is coupled to the second power supply VCC2 through the resistor R8. A third terminal of the electronic switch Q1 is coupled to ground. The second terminal of the electronic switch Q1 is coupled to the I/O pin P2.0 of the microcontroller U2. The second terminal of the electronic switch Q1 is coupled to a cathode of the diode D1. An anode of the diode D1 is coupled to the I/O pin P2.1 of the microcontroller U2.

A first preset number of the pulse signals in a period of time that it takes to be received from the first sensor 11 and the first processor 12 is defined in the microcontroller U2, a second preset number of the pulse signals that is greater than the first preset number is also defined in the microcontroller U2. In addition, a third preset number of the pulse signals which is greater than the second preset number is also defined in the microcontroller U2.

When the protection circuit 100 operates, the blink recognizer 2 outputs pulse signals continually according to the number of blinks received by the first processor 12. The pulse signals are processed by the first processor 12, and then are received by the I/O pin P0.7 of the microcontroller U2. The microcontroller U2 compares a number of the received pulse signals in the period of time with the first, the second, and the third preset numbers. When the number of the received pulse signals is less than the first preset number, the alarm module 14 is off and the machine tool operates normally. When the number of the received pulse signals is larger than the first preset number, and is less than the second preset amount, the I/O pin P2.2 of the microcontroller U2 outputs a first control signal to the buzzer B1, thereby the buzzer B1 sounds every ten seconds for warning, and the machine tool operates normally. When the number of the received pulse signals is larger than the second preset number, and is less than the third preset number, the I/O pin P2.2 of the microcontroller U2 outputs a second control signal to the buzzer B1, thereby the buzzer B1 sounds every three seconds for warning, and the machine tool operates normally. When the number of the received pulse signals is larger than the third preset number, the I/O pin P2.2 of the microcontroller U2 outputs a third control signal to the buzzer B1. Thereby the buzzer B1 sound continuously for warning, and the I/O pin P2.1 of the microcontroller U2 outputs a stop signal to the protection circuit 200 to stop the machine tool.

In the meanwhile, when the distance between the person and the machine tool is less than the preset distance, the infrared sensor 3 outputs a sense signal. The sense signal is processed by the second processor 22, and then is received by the first terminal of the electronic switch Q1. The electronic switch Q1 is turned on. No matter what signal is output from the I/O pin P2.1 of the microcontroller U2, the machine tool receives a low-level signal, such as logic 0, from the electronic switch Q1 and stops operating. The microcontroller U2 stops working and saves energy because the I/O pin P2.1 of the microcontroller U2 receives the low-level signal from the electronic switch Q1.

In at least one embodiment, the electronic switch Q1 can be an npn bipolar junction transistor (BJT), and the first terminal, the second terminal, and the third terminal of the electronic switch Q1 can be a base, a collector, and an emitter of the BJT, respectively.

The protection circuit 100 senses the degree of fatigue and the manual misoperation through the fatigue protection unit 10 and the misoperation protection unit 20, then controls the machine tool to work or not to work to avoid accidents.

The embodiments shown and described above are only examples. Even though numerous characteristics and advantages of the present technology have been set forth in the foregoing description, together with details of the structure and function of the present disclosure, the disclosure is illustrative only, and changes may be made in the detail, including in matters of shape, size and arrangement of the parts within the principles of the present disclosure up to, and including, the full extent established by the broad general meaning of the terms used in the claims.

What is claimed is:

1. A protection circuit coupled to a switch circuit of a machine tool, the protection circuit comprising:
   a fatigue protection unit comprising:
      an alarm module;
      a first sensor detected blink of an operator and output a pulse signal in response to a blink;
      a first processor coupled to the first sensor for receiving and processing the pulse signals; and
      a first controller coupled to the first processor for received the processed pulse signals, and controlled working modes of the alarm module, and controlled the machine tool working or not through the switch circuit, according to the processed pulse signals; and
   a misoperation protection unit comprising:
      a second sensor sensed a distance between a person and the machine tool, and output a sense signal in response that the distance sensed is less than a preset distance;
      a second processor coupled to the second sensor for receiving and processing the sense signal; and
      a second controller coupled to the second processor for receiving the processed sense signal, and controlled the machine tool to stop through the switch circuit.

2. The protection circuit of claim 1, wherein the first sensor comprises a blink recognizer.

3. The protection circuit of claim 1, wherein the second sensor is an infrared sensor.

4. The protection circuit of claim 1, wherein the first processor comprises a first comparator, an inductor, a first capacitor, a first resistor, and a second resistors, a non-inverting input terminal of the first comparator is coupled to the first sensor for receiving the pulse signals, an inverting input terminal of the first comparator is coupled to ground through the first resistor, a power terminal of the first comparator is coupled to a first power supply, a ground terminal of the first comparator is coupled to ground, an output terminal of the first comparator is coupled to ground through the inductor and the first capacitor in that order, a node between the inductor and the first capacitor is coupled to a first terminal of the second resistor, a second terminal of the second resistor is coupled to the first controller.

5. The protection circuit of claim 4, wherein the first controller comprises a microcontroller, a second resistor, a second, and a third capacitors, and a crystal oscillator, a power pin of the microcontroller is coupled to a second power supply, a first input/output (I/O) pin of the microcontroller is coupled to the second power supply through the second resistor, the first I/O pin of the microcontroller is coupled to the first processor, a second I/O pin of the microcontroller is coupled to the misoperation protection unit, a third I/O pin of the microcontroller is coupled to the switch circuit, a fourth I/O pin of the microcontroller is coupled to the alarm module, a timer pin of the microcontroller is coupled to a pulse pin of the microcontroller, a first clock pin of the microcontroller is coupled to a second clock pin of the microcontroller through the crystal oscillator, the first and the second clock pins of the microcontroller are coupled to ground through the second and the third capacitors, respectively, a ground pin of the microcontroller is coupled to ground.

6. The protection circuit of claim 5, wherein the alarm module comprises a buzzer and a fourth resistor, a signal pin of the buzzer is coupled to the fourth I/O pin of the microcontroller through the fourth resistor, a ground pin of the buzzer is coupled to ground.

7. The protection circuit of claim 6, wherein the second processor comprises a fifth, a sixth, and a seventh resistors, a second comparator, a fourth, a fifth, and a sixth capacitors, and a trigger, a non-inverting input terminal of the second comparator is coupled to the second power supply through the fifth resistor, the non-inverting input terminal of the second comparator is coupled to the second sensor for receiving the sense signals, an inverting input terminal of the second comparator is coupled to ground through the sixth resistor, a power terminal of the second comparator is coupled to the first power supply, a ground terminal of the second comparator is coupled to ground, an output terminal of the second comparator is coupled to ground through the fourth capacitor, the output terminal of the second comparator is coupled to a first input pin of the trigger, a second input pin of the trigger is coupled to ground, a ground pin of the trigger is coupled to ground, a power pin of the trigger is coupled to the second power supply, the power pin of the trigger is coupled to ground through the fifth capacitor, an output pin of the trigger is coupled to ground through the seventh resistor and the sixth capacitor in that order, a node between the seven resistor and the sixth capacitor is coupled to the second controller.

8. The protection circuit of claim 7, wherein the second controller comprises an electronic switch, an eighth resistor, and a diode, a first terminal of the electronic switch is coupled to the node between the seven resistor and the sixth capacitor, a second terminal of the electronic switch is coupled to the second power supply through the eighth resistor, a third terminal of the electronic switch is coupled to ground, the second terminal of the electronic switch is coupled to the second I/O pin of the microcontroller, the second terminal of the electronic switch is coupled to a cathode of the diode, an anode of the diode is coupled to the third I/O pin of the microcontroller, wherein the second terminal of the electronic switch is connected to the third terminal of the electronic switch, in response to the first terminal of the electronic switch receiving a high-level signal, wherein the second terminal of the electronic switch is disconnected from the third terminal of the electronic switch, in response to the first terminal of the electronic switch receiving a low-level signal.

9. The protection circuit of claim 8, wherein the electronic switch is an npn bipolar junction transistor (BJT), the first, second, and third terminals of the electronic switch are a base, a collector, and an emitter of the BJT, respectively.

10. A protection circuit configured to be coupled to a switch circuit of a machine tool, the protection circuit comprising:
  a fatigue protection device comprising:
    a first sensor configured to detect a blink rate of an operator and output a pulse signal in response to the detected blink rate;
    a first processor coupled to the first sensor and configured to receive and process the pulse signal; and
    a first controller coupled to the first processor and configured to:
      receive the processed pulse signal,
      control a working mode of an alarm device, and
      control the machine tool to be operational or non-operation; and
  a misoperation protection device coupled to the fatigue protection device, the misoperation protection device comprising:
    a second sensor configured to sense a distance between the operator and the machine tool and output a sense signal in response that the distance sensed is less than a predetermined distance;
    a second processor coupled to the second sensor and configured to receive and process the sensed signal;
    a second controller coupled to the second processor and configured to:
      receive the processor sense signal, and
      control the machine tool to cease operation through the switch circuit.

11. The protection circuit of claim 10, wherein the first sensor comprises a blink recognizer.

12. The protection circuit of claim 10, wherein the second sensor is an infrared sensor.

13. The protection circuit of claim 10, wherein the first processor comprises a first comparator, an inductor, a first capacitor, a first resistor, and a second resistors, a non-inverting input terminal of the first comparator is coupled to the first sensor for receiving the pulse signals, an inverting input terminal of the first comparator is coupled to ground through the first resistor, a power terminal of the first comparator is coupled to a first power supply, a ground terminal of the first comparator is coupled to ground, an output terminal of the first comparator is coupled to ground through the inductor and the first capacitor in that order, a node between the inductor and the first capacitor is coupled to a first terminal of the second resistor, a second terminal of the second resistor is coupled to the first controller.

14. The protection circuit of claim 13, wherein the first controller comprises a microcontroller, a second resistor, a second, and a third capacitors, and a crystal oscillator, a power pin of the microcontroller is coupled to a second power supply, a first input/output (I/O) pin of the microcontroller is coupled to the second power supply through the second resistor, the first I/O pin of the microcontroller is coupled to the first processor, a second I/O pin of the microcontroller is coupled to the misoperation protection device, a third I/O pin of the microcontroller is coupled to the switch circuit, a fourth I/O pin of the microcontroller is coupled to the alarm module, a timer pin of the microcontroller is coupled to a pulse pin of the microcontroller, a first clock pin of the microcontroller is coupled to a second clock pin of the microcontroller through the crystal oscillator, the first and the second clock pins of the microcontroller are coupled to ground through the second and the third capacitors, respectively, a ground pin of the microcontroller is coupled to ground.

15. The protection circuit of claim 14, wherein the alarm module comprises a buzzer and a fourth resistor, a signal pin of the buzzer is coupled to the fourth I/O pin of the microcontroller through the fourth resistor, a ground pin of the buzzer is coupled to ground.

16. The protection circuit of claim 15, wherein the second processor comprises a fifth, a sixth, and a seventh resistors, a second comparator, a fourth, a fifth, and a sixth capacitors, and a trigger, a non-inverting input terminal of the second comparator is coupled to the second power supply through the fifth resistor, the non-inverting input terminal of the second comparator is coupled to the second sensor for receiving the sense signals, an inverting input terminal of the second comparator is coupled to ground through the sixth resistor, a power terminal of the second comparator is coupled to the first power supply, a ground terminal of the second comparator is coupled to ground, an output terminal of the second comparator is coupled to ground through the fourth capacitor, the output terminal of the second comparator is coupled to a first input pin of the trigger, a second input pin of the trigger is coupled to ground, a ground pin of the trigger is coupled to ground, a power pin of the trigger is coupled to the second power supply, the power pin of the trigger is coupled to ground through the fifth capacitor, an output pin of the trigger is coupled to ground through the seventh resistor and the sixth capacitor in that order, a node between the seven resistor and the sixth capacitor is coupled to the second controller.

17. The protection circuit of claim 16, wherein the second controller comprises an electronic switch, an eighth resistor, and a diode, a first terminal of the electronic switch is coupled to the node between the seven resistor and the sixth capacitor, a second terminal of the electronic switch is coupled to the second power supply through the eighth resistor, a third terminal of the electronic switch is coupled to ground, the second terminal of the electronic switch is coupled to the second I/O pin of the microcontroller, the second terminal of the electronic switch is coupled to a cathode of the diode, an anode of the diode is coupled to the third I/O pin of the microcontroller, wherein the second terminal of the electronic switch is connected to the third terminal of the electronic switch, in response to the first terminal of the electronic switch receiving a high-level signal, wherein the second terminal of the electronic switch is disconnected from the third terminal of the electronic switch, in response to the first terminal of the electronic switch receiving a low-level signal.

18. The protection circuit of claim 17, wherein the electronic switch is an npn bipolar junction transistor (BJT), the first, second, and third terminals of the electronic switch are a base, a collector, and an emitter of the BJT, respectively.

* * * * *